United States Patent Office 2,715,127
Patented Aug. 9, 1955

2,715,127

PROCESS FOR THE PREPARATION OF N,N'-DIPHENYL PERYLENE DIIMID AND THE CHLORINATED DERIVATIVES THEREOF

Juerg A. Meier, Cranford, and Marvin O. Shrader, Westfield, N. J., assignors to General Aniline & Film Corporation, New York, N. Y., a corporation of Delaware No Drawing. Application July 3, 1951,
Serial No. 235,094

10 Claims. (Cl. 260—281)

The present invention relates to an improved method for preparing N,N'-diphenyl perylene diimid and its chlorinated derivatives.

N,N'-diphenyl perylene diimid is generally prepared by reacting perylene tetracarboxylic acid anhydride with aniline in a great excess of the amine serving as a diluent for the reaction.

This classical method, for example, is described in Swiss Patent No. 100,706 granted August 16, 1923. According to the patent, 1 mol of perylene tetracarboxylic acid anhydride and about 30 mols of aniline are heated under agitation to a temperature of about 185° C. Such large excess of aniline is prescribed, despite the fact that for the preparation of the diimid, only 2 mols of aniline are required for each mol of the perylene tetracarboxylic acid anhydride.

While the above method is that most usually employed, nevertheless it has certain disadvantages which would recommend the adoption of a more economical alternative process. Thus the method by reason of its use of a large excess of aniline requires a separate step for the recovery of the aniline for reuse. Furthermore, in such recovery step, quantities of the aniline are inevitably lost, and since aniline is an expensive product the overall efficiency of the process is thereby decreased.

N,N'-diphenyl perylene diimid is an intermediate for the preparation of a very valuable scarlet vat dye which is obtained by chlorinating the diimid with sulfuryl chloride in the presence of an organic solvent. This method is described in United States Patent No. 2,054,334 granted to Paul Nawiasky et al. on September 15, 1936.

We have now found a much more economical process for the preparation of the diimid than that heretofore used. Furthermore we have found that the diimid, as we prepare it, may be chlorinated without isolation from the reaction mixture, and, more important still, can be chlorinated directly with elemental chlorine.

Our process involves reaction of the perylene tetracarboxylic acid anhydride with aniline while employing a slight excess of the aniline in a high boiling solvent and in the presence of a dehydrating agent. Such process and the chlorination of the product obtained, particularly by use of elemental chlorine, constitutes the purposes and objects of the present invention.

Our process is carried out by dissolving the anhydride in a high boiling solvent, adding a dehydrating agent and heating the mixture to reflux to remove traces of water present. The desired quantity of aniline is then charged into the mixture and the mixture heated under reflux while removing water formed by distillation.

The mixture is then cooled to a temperature from about 120 to 140° C., a halogen carrier added and chlorination effected, preferably by introduction of chlorine gas. However, if desired, the chlorination can be carried out with sulfuryl chloride as described in United States Patent No. 2,054,334, although the use of gaseous chlorine is preferred. The chlorinated product produced in this manner will be found, upon isolation from the mixture, to be identical with that described in the above patent.

It has been stated above that a slight excess of aniline is used for the reaction. The term "slight excess" as used here is in comparison with the quantities employed in the older process described in the aforesaid Swiss patent. Generally, we will use a quantity of aniline which is from about 75 to 100% in excess of that theoretically required to convert the quantity of the anhydride employed.

The dehydrating agent which is used will be a dehydrating metal halide such as anhydrous zinc chloride, anhydrous ferric chloride and the like. The quantity of such dehydrating agent will usually range from about .5 to 1 mol per mol of the perylene tetracarboxylic acid anhydride.

Preferably, the dehydrating effect of the metal halide is promoted by the use of another dehydrating agent which is a dehydrating weak acid or an alkali metal salt thereof. For this purpose we have found sodium acetate, potassium acetate, sodium benzoate, boric acid, sodium metaborate and sodium tetraborate to be very effective. The additional dehydrating agent is employed in an amount equivalent to that of the metal halide.

The high boiling solvent which is used is one which is inert to the reactants and liquid at the temperatures used in the reaction. For this purpose we recommend nitrobenzene, kerosene, chlorinated kerosene, dichlorobenzene, trichlorobenzene and the like.

The halogen carrier which may be used is any conventionally employed in halogenating reactions such as iodine, ferric chloride, antimony chloride, sulfur, selenium and the like. The halogen carrier will be used in relatively small amount, i. e. a few percent by weight of the material chlorinated.

The invention is further illustrated by the following examples, but it is to be understood that the invention is not restricted thereto. The parts are by weight unless otherwise stated.

*Example 1*

98 parts of perylene tetracarboxylic acid anhydride, 1440 parts of nitrobenzene, 26.5 parts of anhydrous sodium acetate and 26.5 parts of anhydrous zinc chloride are added to a reaction vessel equipped with a water separator. This mixture is heated to reflux until traces of water present are removed by distillation. 81.6 parts of aniline are charged into the reaction mixture and the mixture is heated at a slow reflux for 10 hours while removing water by distillation. The mixture is then cooled to 125° C. and 1.2 parts of iodine are added. Gaseous chlorine is then passed into the mixture for a period of 8 hours until formation of the chlorinated dyestuff is completed. The dyestuff is isolated from the reaction mixture by cooling, filtering, washing with nitrobenzene, and then steam distilling from the solvent.

The dyestuff will be found to be identical to that disclosed in Example 1 of United States Patent No. 2,054,334.

*Example 2*

The procedure is the same as in Example 1, excepting that the nitrobenzene is replaced by an equivalent quantity of o-dichlorobenzene and the anhydrous zinc chloride by an equivalent amount of ferric chloride. The scarlet dyestuff obtained by chlorination is the same as that of Example 1.

*Example 3*

The procedure is the same as in Example 1, excepting that the sodium acetate is replaced by an equivalent quantity of sodium benzoate and the iodine by 2 parts of sulfur. The product obtained by chlorination is substantially the same as that of Example 1.

We claim:

1. The process of producing N,N'-diphenyl perylene diimid which comprises heating perylene tetracarboxylic acid anhydride with an excess of aniline of no more than 100 per cent over that theoretically required for reaction with the anhydride in a high boiling inert organic solvent and in the presence of a dehydrating metal halide.

2. The process as defined in claim 1, wherein the dehydrating metal halide is anhydrous zinc chloride.

3. The process as defined in claim 1 wherein the diimid is chlorinated without isolation from the reaction mixture.

4. The process as defined in claim 1 wherein the diimid is chlorinated with gaseous chlorine without isolation from the reaction mixture.

5. The process as defined in claim 1 wherein the aniline is used in an amount which is 75 to 100° in excess of that theoretically necessary for combination with the anhydride.

6. The process of producing N,N'-diphenyl perylene diimid which comprises refluxing perylene tetracarboxylic acid anhydride and aniline in nitrobenzene containing anhydrous sodium acetate and anhydrous zinc chloride as a dehydrating agent, the quantity of aniline employed being 75 to 100% in excess of that theoretically necessary for reaction with the anhydride.

7. The process as defined in claim 6 wherein the diimid formed is chlorinated by gaseous chlorine without isolation from the reaction mixture.

8. The process as defined in claim 7 wherein the chlorination is carried out in the presence of iodine.

9. The process of producing N,N-diphenyl perylene diimid which comprises heating perylene tetracarboxylic acid anhydride with an excess of aniline of no more than 100 per cent over that theoretically required for reaction with the anhydride in a high boiling inert organic solvent and in the presence of a mixture of a dehydrating metal halide and an alkali metal salt of a weak acid.

10. The process as defined in claim 9 wherein the dehydrating metal halide is anhydrous zinc chloride and the salt is anhydrous sodium acetate.

References Cited in the file of this patent

UNITED STATES PATENTS

| 1,913,052 | Jaeger et al. | June 6, 1933 |
| 2,054,334 | Nawiasky et al. | Sept. 15, 1936 |
| 2,543,747 | Shrader | Mar. 6, 1951 |

FOREIGN PATENTS

| 430,632 | Germany | June 19, 1926 |